United States Patent [19]

Forshee

[11] 4,406,366

[45] Sep. 27, 1983

[54] V-SHAPED ENGINE TRANSLATION RACK

[76] Inventor: David J. Forshee, 350 Lakes Edge Dr., Oxford, Mich. 48051

[21] Appl. No.: 291,992

[22] Filed: Aug. 11, 1981

[51] Int. Cl.³ .............................................. B65D 85/68
[52] U.S. Cl. .................................. 206/319; 206/386; 211/13; 248/671; 410/31
[58] Field of Search ................. 206/319, 386; 220/1.5; 248/671, 678; 211/182, 113, 13, 4; 108/51.3, 55.1, 55.3, 56.3; 410/30–50

[56] References Cited

U.S. PATENT DOCUMENTS

| 2,341,801 | 2/1944 | Miller | 410/46 |
| 2,428,893 | 10/1947 | Procissi | 410/31 |
| 2,632,567 | 3/1953 | Richtmyer | 211/13 |
| 3,809,234 | 5/1974 | Kurick | 206/386 |
| 4,010,849 | 3/1977 | Pater et al. | 410/35 |
| 4,098,409 | 7/1978 | Massey | 206/319 |
| 4,254,873 | 3/1981 | Cook et al. | 206/599 |

FOREIGN PATENT DOCUMENTS

1605031 3/1970 Fed. Rep. of Germany ........ 410/49
633303 2/1962 Italy ...................................... 410/49

Primary Examiner—George E. Lowrance
Assistant Examiner—Jimmy G. Foster
Attorney, Agent, or Firm—Benjamin W. Colman

[57] ABSTRACT

A material handling rack to translate articles having in part a V-shaped cross-section, at which the article is at least partially supported, and spaced apart relatively opposing generally upwardly-facing plastic article-support members removably secured to transverse rails affixed to the rack frame. The transverse rails are arranged in parrallel from one longitudinal end to the other and define open spaces therebetween for admission of said articles to be supported by the said plastic members which are secured to and extend laterally from the transverse rails into the region of the open spaces therebetween. Manually operable plastic detent hold-down arms are movably attached to the plastic support members to alternately engage with or disengage from laterally extending surfaces of the articles whereby to secure the latter in or release them for removal from the rack frame.

28 Claims, 17 Drawing Figures

V-SHAPED ENGINE TRANSLATION RACK

BACKGROUND OF THE INVENTION

The invention relates to a translation rack embodying plastic component members forming supporting cradles for V-shaped engine units for their movement from one station or location to another, providing rapid manual securement and release of the engines to and from the rack.

Automotive engines have been carried in various kinds of racks, and in the main these have been primarily constructed of steel, the components of which are welded together to provide supports and retention devices for the engines. Principal problems with such all-steel racks have included the direct transmission of shock to the engines because of the inflexibility of the rack components, resulting in a great incidence of damage to the engines and the racks. Again, fracture of or damage to steel rack components caused engines to break loose from their supports resulting in their damage and in further damage to the rack. The failure of engine retention means to lock the engines in these steel racks, because of the complexity of such mechanisms, engendered time consuming difficulties in engagement and disengagement of the devices to permit facile loading and unloading of the engines. The heavy tare weight of the steel racks carried in trucks and railroad cars increased the energy needs of such equipment and the handling problems incident to all-steel rack constructions.

The losses in maintenance and repair of damaged material handling equipment and the engines carried therein have significantly increased costs of manufacturing, processing and storage. The instant invention provides an acceptable solution at least in part to these problems.

SUMMARY OF THE INVENTION

The invention comprises a shipping or translation rack for V-shaped engines having steel support rails and a plurality of plastic engine supporting and locking components secured to the rails, the plastic components being arranged on either side of the engines so that open spaces are provided between the components for insertion of the engines into and their removal from such spaces with maximum ease and facility. The plastic components include quick-acting manually operable lever devices for engagement and locking of the engines in the plastic components. Thus, when an engine is carried by a hoist to the rack and lowered thereinto, the engine comes to rest upon and between supporting pads, and levers are manually pivoted into engagement with the engines, quickly, easily and automatically locking them into the rack. The locking mechanism engages laterally projecting ledges, such as an oil pan supporting rim, adjacent recesses in the sides of the engine housing so that the levers enter such recesses and provide a detent for the ledges, securing the engines against elevation or lateral movement from their supporting pads. The rest pads also include detent means against longitudinal movement of the engines. Thus, the engine is firmly secured against disengagement from the rack.

The advantages of a rack embodying the invention include the absence of steel hold-down straps, linkage or other locking mechanisms which are inflexible and sometimes cause damage to the engines and are often difficult to operate. The weight of the rack including the plastic components of this invention is very much lighter than that of an all-steel rack for the same load units carried thereby. The damage to engines carried by the inventive rack is substantially nonexistent or trivial by comparison to the damage occurring when all-steel racks are used, appreciably reducing the high cost of processing and maintaining the engines in their translation through assembly operations, to storage, to shipping carriers, and during shipment. The cost of maintaining and servicing a rack with these plastic components is substantially less than that of comparable all-steel racks now in use. Since the plastic members are each integrally molded of a super tough nylon material as unitary components and designed for attachment to the steel framing or rails of the rack, the replacement cost of any plastic component is appreciably less than that of maintaining and reconstructing steel engine supports and hold-down devices by burning off, cutting, welding and reassembling the damaged parts. Additionally, plastic components are color impregnated, according to customer or governmental requirements, and no painting or repainting is necessary. Plastic materials do not rust and there is no appreciable deterioration of the components, as occurs in all-steel cradle or rack constructions. The efficiencies of construction, maintenance and service of the engine translation rack of this invention are significantly greater than those in all-steel racks.

The plastic components in the rack have the distinct advantage that they will not damage or mar the exterior surfaces of aluminum engine blocks carried by the rack. The inventive embodiment will accommodate either 6- or 8-cylinder V-shaped engine blocks, wherein the outer configuration characteristics of the two engines match the plastic engine support members designed for both such engines.

Various further and more specific objects, features and advantages of the invention will appear from the description given below, taken in connection with the accompanying drawings, illustrating by way of example a preferred embodiment of the invention. Reference is here made to the drawings annexed hereto and forming an integral part of this specification.

DETAILED DESCRIPTION OF THE PREFERRED EMBODIMENT

A preferred embodiment of the invention is illustrated in the accompanying drawings. The engine rack 10 comprises a set of steel framing members including the corner posts 12 connected by the longitudinally extending side rails 14 and 16 disposed one below the other respectively, the transverse end rails 18, and the intermediate transverse rails 20 connected in parallel to and between the upper side rails 14, 14 for support of the V-shaped engines E. The rack frame construction is primarily that formed by steel channel and/or angle members welded together to provide open spaces or pockets between the parallel transverse rails for admission of engines thereinto.

The rack 10 further includes the plastic engine-cradling components hereinafter described. The plastic support members for the engines E are mounted upon and secured to the transverse rails 20 by conventional fasteners such as bolts, washers, and nuts. The plastic components are preferably unitary in form and integrally molded of high-strength polyamide nylon material, such for example as Dupont's Zytel ST nylon material, which is molded into the configurations illustrated and hereinafter described. The plastic material can be reinforced, if necessary, with fiberglass filaments or other suitable reinforcing fillers designed to add tensile and compressive strength to the material. The plastic can also be color-coded where desirable or necessary.

Figure 1:
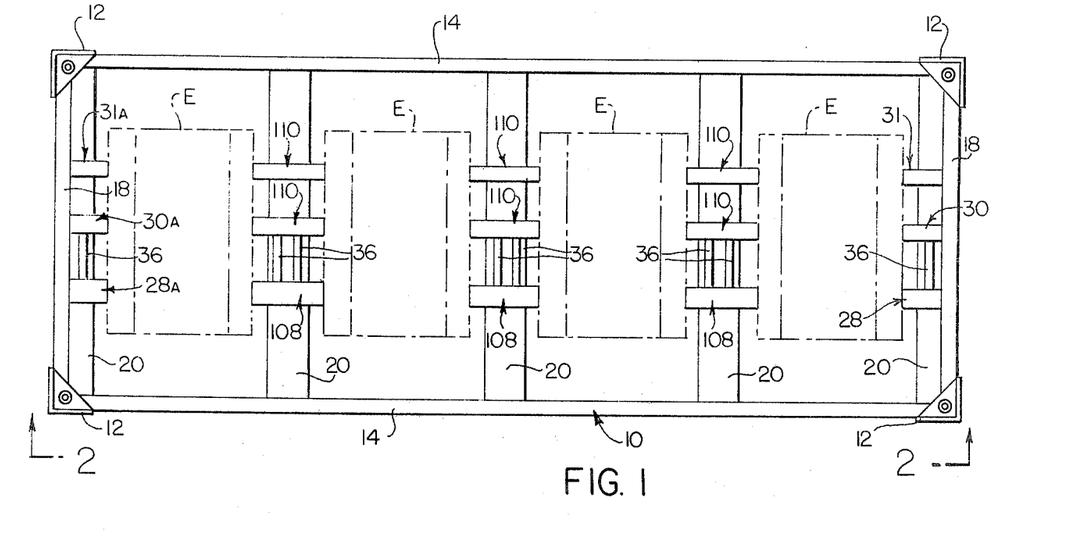
FIG. 1 is a top plan view of a preferred embodiment of the invention showing V-shaped engines (phantom lines) supported in plastic cradling component members secured transversely to pairs of spaced apart framing support rails.
Figure 2:
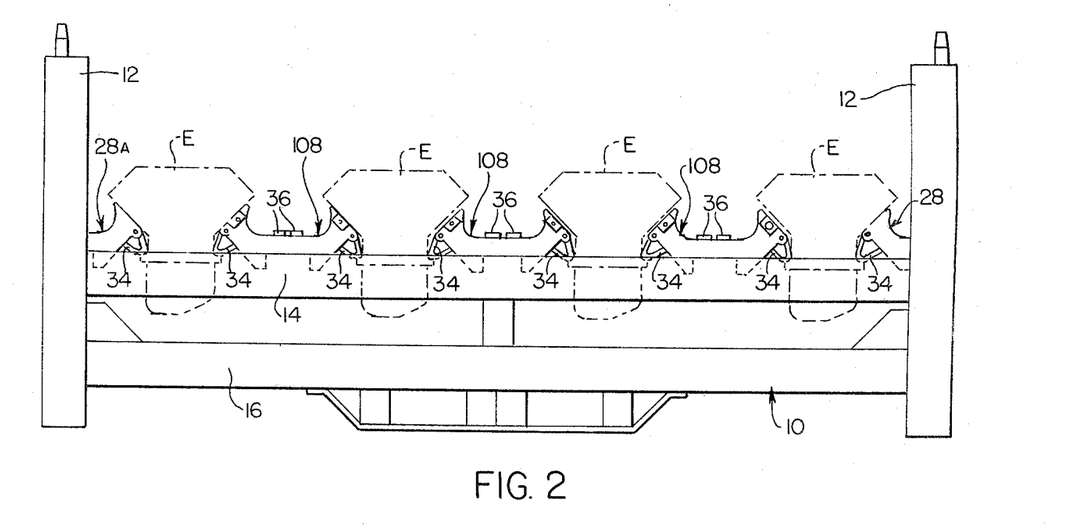
FIG. 2 is a side elevational view of the rack illustrated in FIG. 1, taken substantially on the line 2—2 of FIG. 1.
Figure 3:
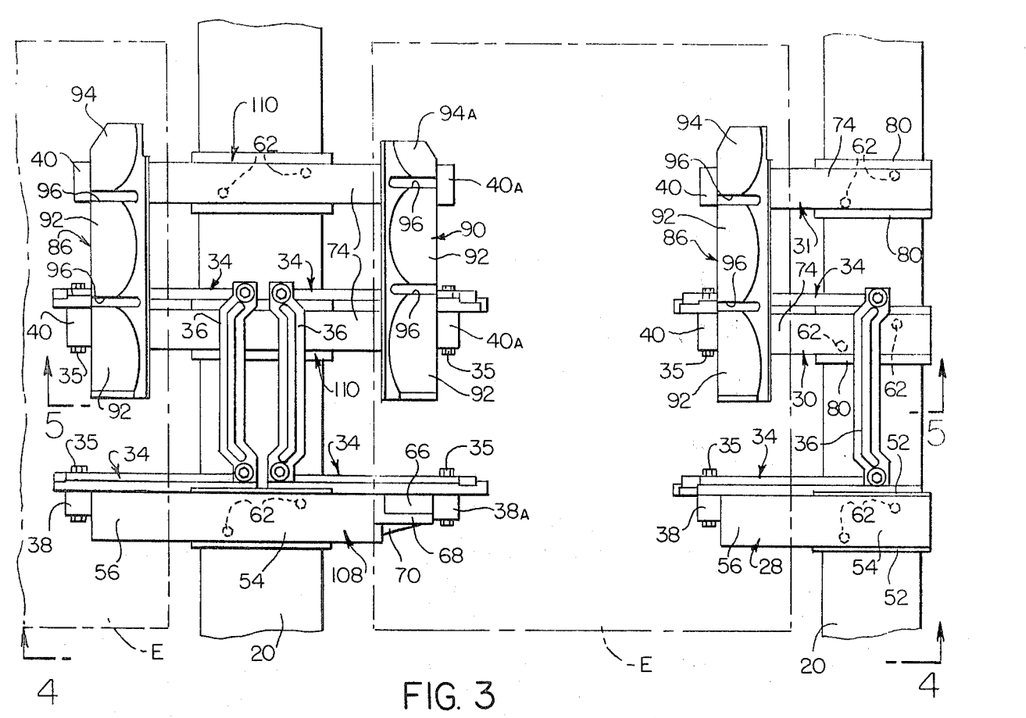
FIG. 3 is a fragmentary top plan view taken at the right end of the rack illustrated in FIG. 1.
Figure 4:
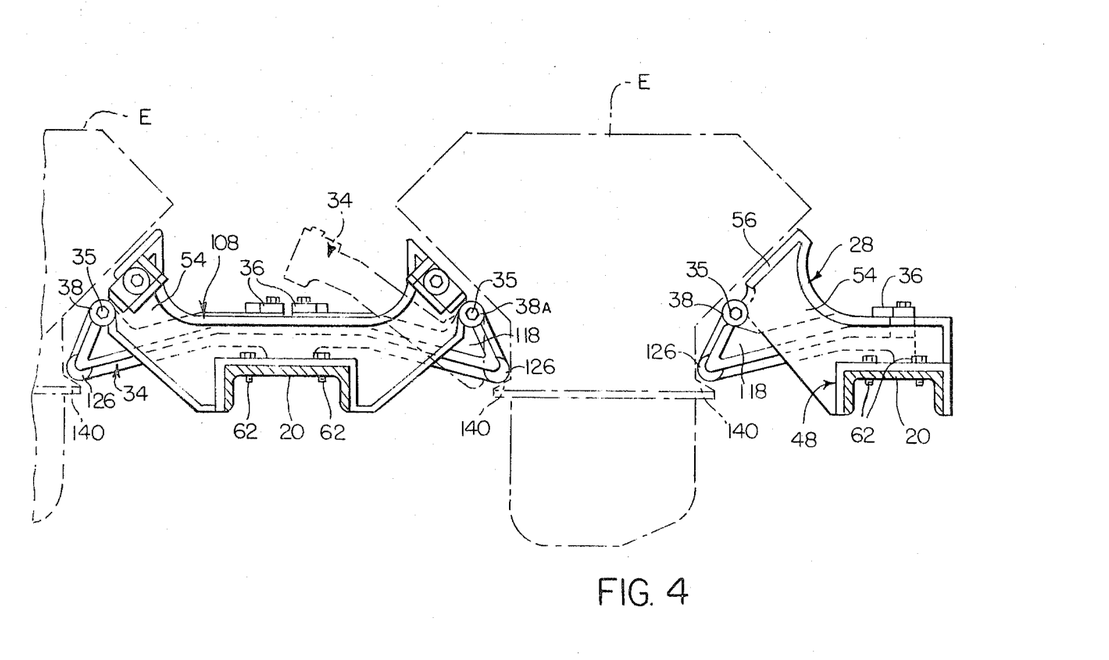
FIG. 4 is a front elevational view taken substantially on the line 4—4 of FIG. 3.
Figure 5:
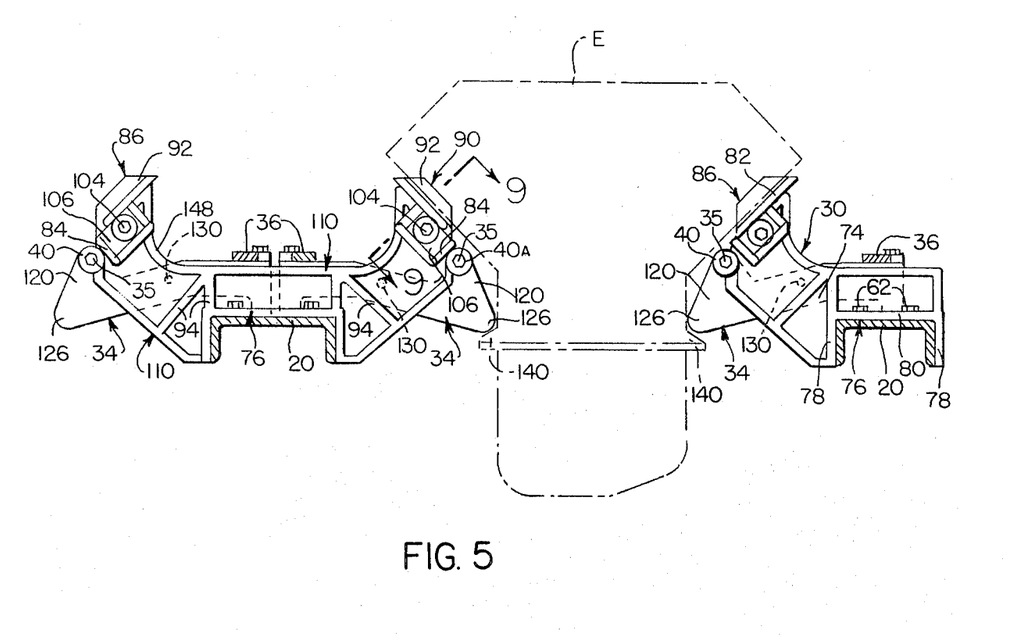
FIG. 5 is a vertical longitudinal sectional view taken substantially on the line 5—5 of FIG. 3.
Figure 6:
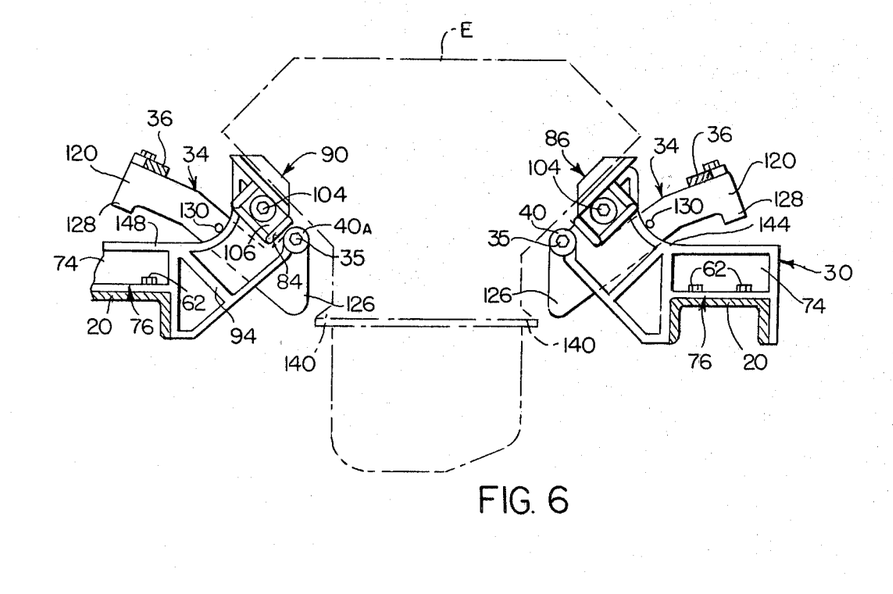
FIG. 6 is a view similar to that illustrated in FIG. 5, showing the locking levers pivotally elevated and out of the open space into which the engine enters for support upon its cradling or nesting components.
Figure 7:
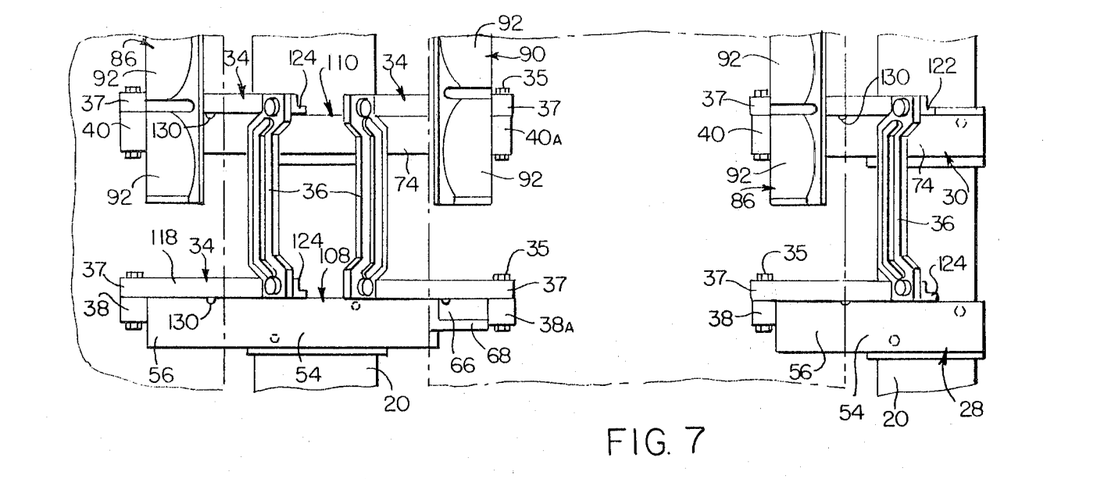
FIG. 7 is a fragmentary top plan view, similar to that illustrated in FIG. 3, but showing the locking levers elevated as in FIG. 6.

It will be noted in FIGS. 1 and 2 that to make the most efficient use of the space in the rack, the plastic component members are split in their supporting relationship to the engine's shape at each end of the rack and duplexed, i.e. combined, in the intermediate or inner portions of the rack.

Although I have described herein a rack frame having steel transverse rails 20, it will of course be understood that such transverse rails can be made of suitable plastic materials having sufficient tensile and compressive strength to support the loads of engines or other load articles carried thereon. Further, the transverse rails need not necessarily be channel-shaped but may also take the form of I-beams, or other suitable forms, that can be secured to the side rails of the rack frame. If such transveerse rails are made of plastic material, depending on molding capability, the plastic engine support members hereinabove specified can be integrally molded with the transverse rail.

Plastic transverse rails can be secured to steel side rails 14, 14 in any suitable manner and by conventional means such as bolts, washers and nuts. Further, such plastic transverse rails can also be mounted upon plastic side rail members of an all-plastic translation rack, such as is disclosed in my co-pending application Ser. No. 246,725 for "Plastic Material Handling Rack."

The integrally molded unitary plastic support members at each longitudinal end of the rack comprise outer forward engine support members 28 and 28A, outer nest support members 30 and 30A, and 31 and 31A to which a nest bank 86 is removably attached, and a pair of hold-down arms 34 pivotally mounted on and in parallel with the outer forward engine support members 28 and 28A, and the next adjacent outer nest support members 30 and 30A. The arms 34, in pairs, are connected together at their distal ends by a manually operable handle 36. The hold-down arms 34 are each pivotally mounted on pins or other suitable fasteners 35 extending through bosses 37 on the arms and through bosses 38 on the distal ends of the support members 28 and the bosses 40 on support members 30 and 30A, and 31 and 31A.

The plastic components at the left end of the rack 10 (FIGS. 1 and 2) are the obverse and counterparts of those at the right end of the rack, and bear the same reference numerals for substantially identical elements (though reversed in direction in some instances) plus the letter "A" for counterpart elements wherever shown in the drawings.

Figures 10, 11, 12, 13, 14:
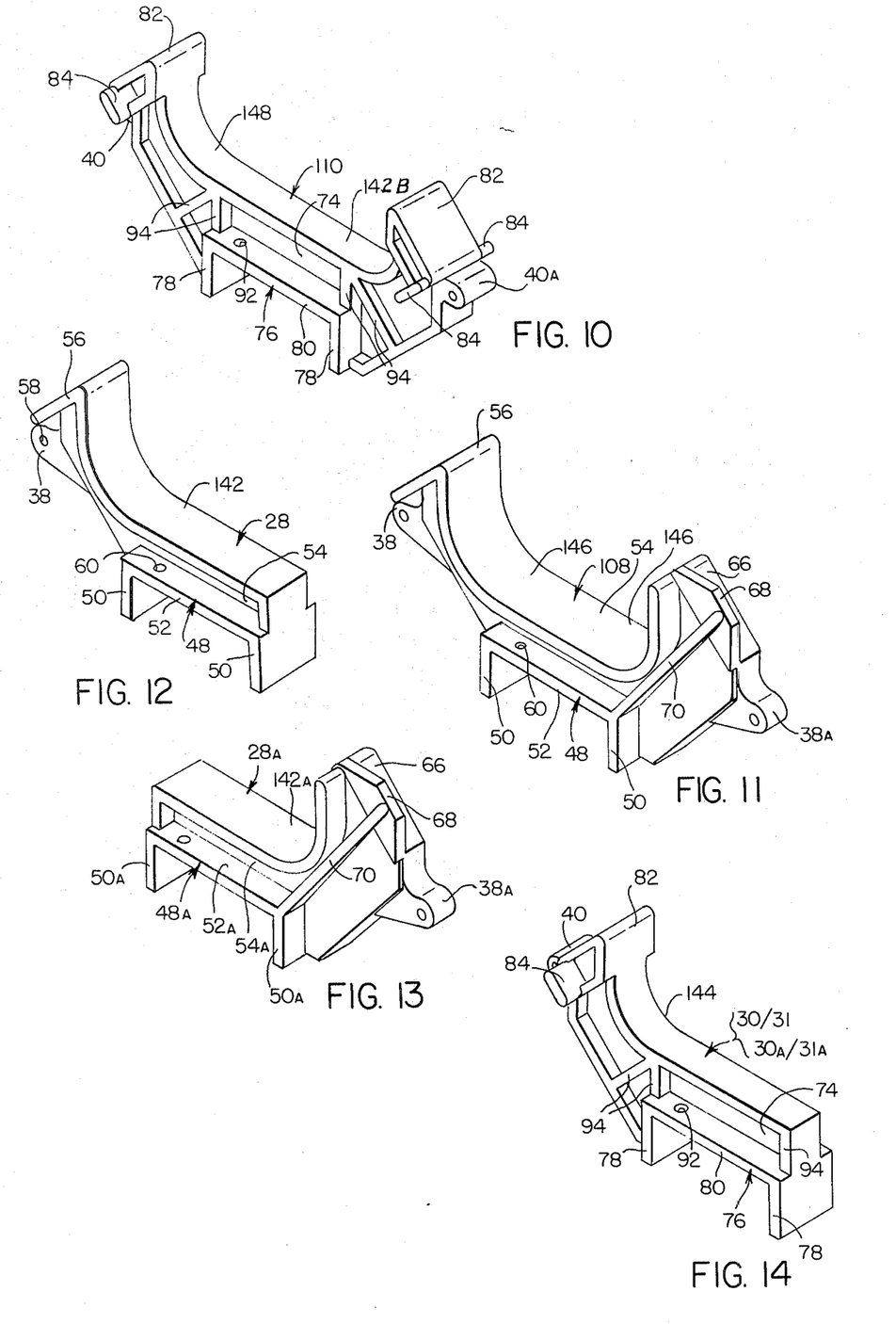
FIGS. 10-14 inclusive are perspective views of the several plastic components used in the rack embodiment illustrated in the foregoing views of the drawings.

Referring now more particularly to FIGS. 12, 13 and 14, as applied to FIGS. 3-9 inclusive, the outer forward support member 28 comprises a channel section 48 having dependent legs 50, 50 and an intermediate web portion 52 adapted to closely overlie and seat upon the transverse channel 20, a body portion 54 terminating at its distal end with an angulated rest pad 56 and the boss 38. The intermediate web portion 52 extends laterally outwardly on both sides of the body 54 to provide a rest surface for the hold-down arm 34 pivotally mounted upon the boss 38 at its pin bore 58. The intermediate web portion 52 is further provided with a pair of openings 60 for admission of threaded fasteners 62 therethrough for securement of the support member 28 to the transverse channel 20.

The counterpart and obverse outer forward support member 28A is constructed similarly to the support member 28 except that its engine rest pad 66 is not as broad as the rest pad 56 of member 28 and is foreshortened by the upwardly projecting detent 68 engageable with a surface of the engine E to limit and prevent forward movement of the engine (i.e. transversely) relative to the support member. The detent 68 is reinforced by a rib member 70 disposed at right angles in a backup relationship to the detent.

The outer support members 30 and 31, 30A and 31A (FIG. 14) are each constructed in a manner similar to that described for the outer forward support member 28. Each of these is provided with a body 74, a channel-shaped section 76 having vertically depending legs 78, 78 and an intermediate web section 80 adapted to closely overlie and seat upon the transverse channel 20, an angulated nest bank support pad 82 at its distal end, and adjacent nest bank detent flanges or pads 84 on either side of the pad at its lower end to limit downward movement of the nest bank 86 engaged upon and with the pads 82 of the support members 30 and 31, and a boss 40 at its distal end for support of a hold-down arm 34.

The counterpart obverse support members 30A and 31A which support the nest bank 90 are the same as the support members 30 and 31. The laterally extending portions of the intermediate web section 80 of the support members are provided with openings 92 therethrough for admission of fasteners 62 that mount the support members to the transverse channels 20. The support members are further provided with reinforcing ribs 94 extending laterally on each side of the body 74 in areas where greater compressive strength may be required.

The nest bank members 86 and 90, providing rest pad support for the right hand and left hand angulated surfaces respectively of the engine E, are constructed with substantially identical features. The upper surface of each nest bank member is contoured with arcuate, substantially parallel, concavely recessed surfaces 92, 92 and 94, the latter surface being somewhat at variance in its width with the surface 94A of the nest bank 90. The concavely curved surfaces are separated from each other by transversely extending grooves 96 therebetween. The underside of the nest bank body 98 is provided with a pair of undercut transverse recesses 100, 100 through which the support pads 82 of the nest bank support members 30 and 31, 30A and 31A, and the support pads 82 of the inner intermediate nest bank supports 110 (FIG. 10) will seat until the nest banks 86 and 90 come to rest against the detent flanges 84. The nest bank body 98, at its recesses 100, 100, is further provided with inturned flanges 102, 102 to secure the nest banks firmly upon the support pads 82 of the outer support members 30 and 31, 30A and 31A, and the inner intermediate support members 110.

As seen particularly in FIG. 10, the inner intermediate support member 110 is provided at each longitudinal end thereof with the support pad 82, detent flanges 84, 84 extending laterally of the support pad, laterally extending reinforcing ribs 94, the channel-shaped section 76 adapted to seat upon and be secured to the transverse channel member 20, and the boss 38A at one end and a boss 38 at the other end upon which a pair of aligned hold-down arms 34 can be mounted and pivotally secured.

The inner intermediate forward support member 108 (FIG. 11) is constructed with features substantially identical to those of the outer forward support members 28 and 28A, including a body 54 having a lower depending channel section 48, a rest pad portion 56 and a boss 38 at its left distal end, and a foreshortened angulated rest pad 66, extending laterally to the detent member 68, reinforced for strength by the ribs 70, to limit forward movement of the engine E resting thereon, and a boss 38A at its right distal end. The bosses 38 and 38A are in alignment for support of the hold-down arms 34 secured thereto for pivoting movement on pins or fasteners 35 passed therethrough.

Figures 8, 8A, 9, 15, 16:
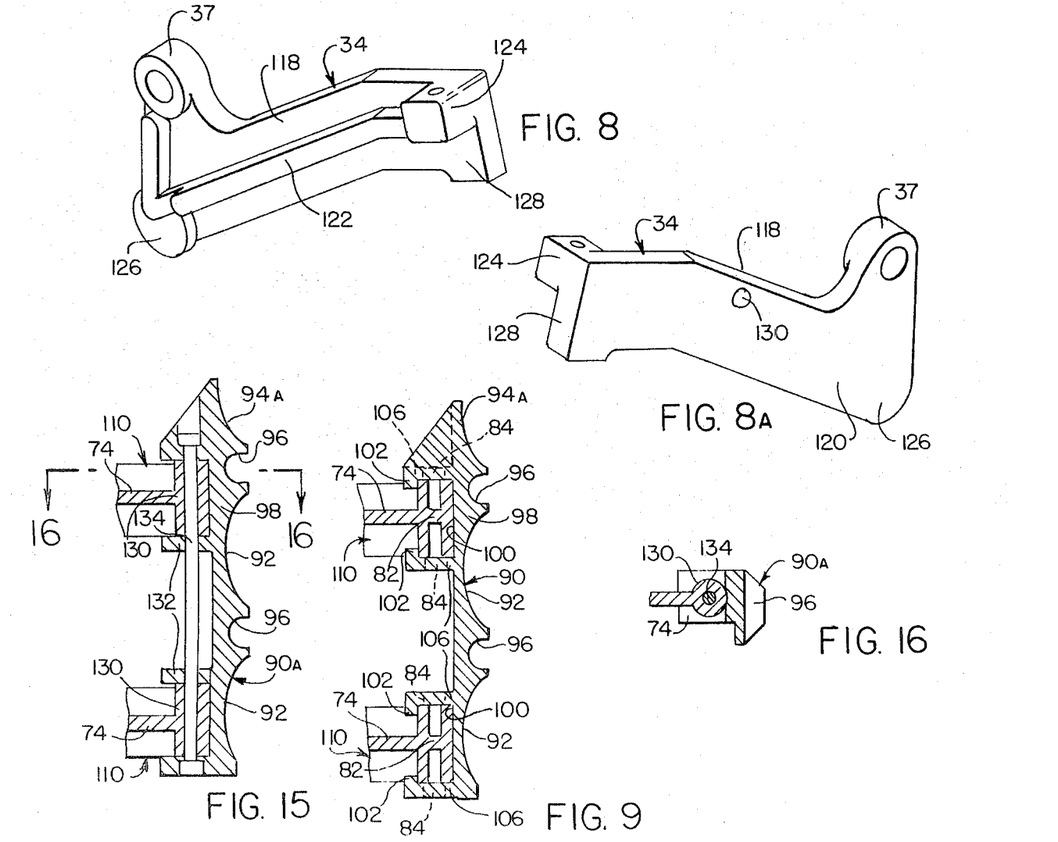
FIGS. 8 and 8a are perspective views from the outside and inside respectively of the hold-down arms.
FIG. 9 is a relatively angular sectional view transversely through a portion of the plastic components, taken substantially on the line 9—9 of FIG. 5.
FIG. 15 is a sectional view substantially similar to that in FIG. 9 but showing a pivoting nest bank on bearing supports of the article nest support members.
FIG. 16 is a transverse sectional view taken substantially on the line 16—16 of FIG. 15.

The hold-down arms 34, FIGS. 8 and 8A, whether left or right hand, comprise a body 118, a substantially smooth planar inside surface 120, a laterally extending outer reinforcing rib 122, a handle-engaging lug 124 projecting laterally outwardly at the distal end of the arm, and an engine-engaging detent 126, generally arcuate in longitudinal edgewise configuration and substantially in parallel alignment with the pivoting boss 37. The hold-down arm is further provided with a depending stop 128, below the handle lug 124, adapted to bear upon the laterally extending portions of the webs 52, 52A and 80 of the support members 28, 28A, 30, 30A, 31, 31A, 108 and 110. The hold-down arm is also provided on its smooth inside surface 120 with a laterally outwardly projecting rounded detent 130, whereby when the hold-down arm is in rest position and engaged with and upon the laterally extending engine rim flanges 140 the detent projection 130 will lie below the laterally projecting flanges 142 of member 28, 142A of member 28A, 144 of member 30, 30A, 31 or 31A, 146 of member 108, and 148 of member 110. Thus, as shown more particularly in FIGS. 5 and 6, when the hold-down arms are engaged upon the engine rims 140, the detent portions 126 of the arms restrict upward movement of the engine, and when the arms are pivoted out of engagement with and above the upper surfaces of the engine rims (FIG. 6), by manual grasping and lifting of the arms by their handles 36, the detent 130 on the inner face 120 of the arm slips past the flanges 142, 144, 146 and 148 to release the engine E then freely at rest on the nest banks 86 and 90.

Handles 36 are secured to the hold-down arm projections 124 by conventional fasteners passed through openings at the ends of the handle and openings in register therewith in the arm lug or projection 124.

The nest banks 86 and 90 are each secured to their supporting pads 82 by conventional fasteners 104 passed through openings in the pads 82 and the flange portions 106 defining the recesses 100 in the nest supports.

Alternatively, the nest banks 86 and 90 can be pivotally mounted on bearing supports 130, 130 extending upwardly from the body portions 74 of the nest support members at the distal ends thereof. As shown particularly in FIGS. 15 and 16, the bodies 98 of the nest banks 86 and 90 are provided with depending bosses 132 having longitudinally extending axially aligned bores through which a single pin 134 (or separate pins) can be inserted allowing the nest banks to rotate thereon relatively to any angle upwardly and downwardly to the flanges or stop pads 84, 84. Thus, the article-support members 30, 30A, 31, 31A, 108 and 110 will accommodate articles or engines having load surfaces which are at a 45° angle to the vertical (90° included) or at a 30° angle to the vertical (60° included). In V-shaped engines, some have their piston cylinders at a 90° included angle and some at a 60° included angle. Such a rack, embodying the pivoting nest banks 86A and 90A, will accommodate either or both engines in the same rack.

Although the nest supports 30 and 31, 30A and 31A, are shown in pairs supporting the nest banks 86 and/or 90, it will of course be understood that for various load articles having at least in part a V-shaped cross-sectional configuration three or more such nest support members may be required, or in some instances only a single nest support member may be necessary, in addition to the forward support member of each set mounted on a transverse rail. Much depends upon the load and size of the article to be translated by the rack.

Having disclosed herein certain particular preferred embodiments of the invention for purposes of explanation, further modifications or variations thereof, after study of this specification, will or may occur or become apparent to persons skilled in the art to which the invention pertains. Reference should be had to the appended claims in determining the scope of the invention.

I claim:

1. In a material handling rack for translating a plurality of articles having at least in part a generally V-shaped cross-sectional configuration, such for example as but not limited to automobile engines, wherein said rack is provided with a frame having a plurality of substantially parallel, longitudinally spaced apart transverse rails disposed in a relatively elevated horizontal plane for support of said articles thereon, said rails defining open spaces therebetween for admission of said articles thereinto, characterized by the improvement comprising
   plastic article support members in longitudinally aligned sets removably secured to said transverse rails in opposedly facing relationship across each said open space, said article support members having elements thereof complementary to angulated outer surfaces of said generally V-shaped part(s) of said articles to provide angulated rest surfaces supporting said article thereon therebetween, manually operable plastic detent lever means hingedly secured to and adjacent the distal ends of said article support members for pivoting engagement with and disengagement from detent-engaging surfaces of said articles to secure them in and release them for removal from said rack frame,
   said detent lever means releasably engaging said articles at detent-engaging elements projecting laterally from said articles in a plane below said angulated rest surfaces.

2. The rack defined in claim 1, wherein:
   said transverse rails and a set of said article-support members are integrally molded of plastic material.

3. The rack defined in claim 1, wherein:
   said rest surfaces across each said open space are angulated inwardly toward each other to complement the angulated surfaces of an article adapted to rest thereon.

4. The rack defined in claim 1, wherein:
   each set of said plastic article-support members comprises:
   two or more article-support members arranged in parallel and extending laterally of and from each said transverse rail into the region of each said open space therebetween,
   said article-support members of each said set being disposed in alignment longitudinally of said rack frame.

5. The rack defined in claim 1, wherein:
   each set of said plastic article-support members comprises:
   a forward article-support member, and a pair of nest article-support members rearwardly of said forward member and in substantially parallel alignment therewith,
   said article-support members having portions thereof extending laterally of and from each said transverse rail into the region of each said open space therebetween, said article-support members of each said set being disposed in alignment longitudinally of said rack frame.

6. The rack defined in claim 5, wherein:
   said rack frame is provided with outer sets of article-support members on the transverse rails adjacent each longitudinal end of said rack frame, and with inner sets of article-support members on the transverse rails intermediate the said rails adjacent each end of the rack frame,
   said outer sets having their article-supporting rest surfaces directed longitudinally inwardly, said inner sets having their article-supporting rest surfaces at each distal end of their support members directed longitudinally toward the opposite side of the open space therebetween.

7. The rack defined in claim 6, wherein:
   each said outer set of said plastic article-support members comprises:
   a forward support member, and a pair of nest support members rearwardly of said forward member and in substantially parallel alignment therewith.

8. The rack defined in claim 7, wherein:
   each said outer forward and nest support members comprises:
   a body having a transverse recess on its underside adjacent its proximal end complementing the cross-sectional configuration of said transverse rail to which it is secured,
   a boss at its distal end for support of said detent means thereon,
   and an article-supporting rest pad at its distal end directed generally upwardly for bearing contact with a surface portion of said article.

9. The rack defined in claim 8, wherein:
   one of said outer forward article-support members is provided with an upstanding detent element adjacent said distal end rest pad to limit forward axial shift of said article on said support members.

10. The rack defined in claim 9, wherein:
   the body of said one outer forward article-support member is provided with a reinforcing rib substantially at right angles to and at the back of said detent element.

11. The rack defined in claim 6, wherein:
   each said inner set of said plastic article-support members comprises:
   a forward support member, and a pair of nest support members rearwardly of said forward member and in substantially parallel alignment therewith.

12. The rack defined in claim 11, wherein:
   each said inner forward support member comprises:
   a body having a transverse recess on its underside medially of said member complementing the cross-sectional configuration of said transverse rail to which it is secured,
   a boss at each distal end for support of said detent means thereon,
   and an article-supporting rest pad at each distal end directed generally upwardly for bearing contact with a surface portion of said article.

13. The rack defined in claim 12, wherein:
   one of said inner forward article-support members is provided with an upstanding detent element adjacent one distal end rest pad to limit forward axial shift of said article on said support members.

14. The rack defined in claim 13, wherein:
   the body of said one inner forward article-support member is provided with a reinforcing rib substantially at right angles to and at the back of said detent or stop element.

15. The rack defined in claim 1, wherein:
   said manually operable plastic detent means comprises: hold-down arms each having:
   an elongated lever body,
   a pivoting boss at the proximal end of said body,
   and an article-engaging portion relatively adjacent said pivoting boss and movable into the region of one said open space,
   each said hold-down arm being movably mounted on an article-support member.

16. The rack defined in claim 15, wherein:
   said hold-down arms are handle-connected in pairs for pivoting movement in pairs.

17. The rack defined in claim 16, wherein:

each said hold-down arm is provided at its distal end with a handle-connecting lug.

18. The rack defined in claim 15, wherein:
each said hold-down arm has a planar inner surface with a detent projection extending laterally outwardly therefrom for sliding engagement with the article-support member to which said arm is pivotally connected in parallel.

19. The rack defined in claim 18, including:
a manually operable handle secured to the distal ends of a pair of said hold-down arms at said lugs.

20. The rack defined in claim 1, wherein:
said detent means comprises pairs of hold-down arms pivotally connected to said article-support members in longitudinal alignment.

21. In a material handling rack for translating a plurality of articles having at least in part a generally V-shaped cross-sectional configuration, the improvement comprising
a rack frame having a plurality of substantially parallel, longitudinally spaced apart transverse rails disposed in a relatively elevated horizontal plane,
said rails defining open spaces therebetween for admission of said articles thereinto,
plastic article-support members in longitudinally aligned sets removably secured to said transverse rails in opposedly facing relationship across each said open space,
said article-support members having elements thereof complementary to angulated outer surfaces of said generally V-shaped part(s) of said articles to provide rest surfaces supporting said article thereon therebetween,
and manually operable plastic detent means pivotally secured to and adjacent the distal ends of said article support members for engagement with and disengagement from detent-engaging surfaces of said articles to secure them in and release them for removal from said rack frame,
each set of said plastic article-support members comprising
a forward article-support member,
and a pair of nest article-support members rearwardly of said forward member and in substantially parallel alignment therewith,
said article-support members having portions thereof extending laterally of and from each said transverse rail into the region of each said open space therebetween,
said article-support members of each said set being disposed in alignment longitudinally of said rack frame,
said rack frame being provided with outer sets of article-support members on the transverse rails adjacent each longitudinal end of said rack frame, and with inner sets of article-support members on the transverse rails intermediate the said rails adjacent each end of the rack frame,
said outer sets having their article-supporting rest surfaces directed longitudinally inwardly,
said inner sets having their article-supporting rest surfaces at each distal end of their support members directed longitudinally toward the opposite side of the open space therebetween,
each said inner nest support member comprising:
a body having a transverse recess on its underside medially of said member complementing the cross-sectional configuration of said transverse rail to which it is secured;
a boss at each distal end for support of said detent means thereon,
and a nest bank supporting projection at each distal end of said nest support member body directed generally upwardly for removable attachment to said nest bank.

22. The rack defined in claim 21, including:
a nest bank member having article-supporting rest pads directed generally upwardly for bearing contact with underside surface portions of said article.

23. The rack defined in claim 12 or 21, wherein:
said bosses at each distal end of said inner forward and nest support members for support of said detent means thereon are in longitudinal alignment.

24. The rack defined in claim 22, wherein:
each said nest bank is supported on a pair of said projections.

25. The rack defined in claim 22 or 24, wherein:
each said nest bank supporting projection is in the form of a bearing support,
said nest bank being pin mounted on said bearing support(s) for pivoting movement transversely thereof.

26. The rack defined in claim 22, wherein:
the body of each said nest bank is transversely slotted on its underside to receive said generally upwardly directed projections and to removably secure said nest bank thereon.

27. The rack defined in claim 27, wherein:
each said nest bank has an upper surface making bearing contact with complementary surface portions of said article to support said article securely thereon.

28. The rack defined in claim 22, wherein:
each said nest bank upper surface is provided with transverse concave recesses complementary to transverse convex surfaces on the underside of said article in bearing contact thereon.

* * * * *